Figure 1:
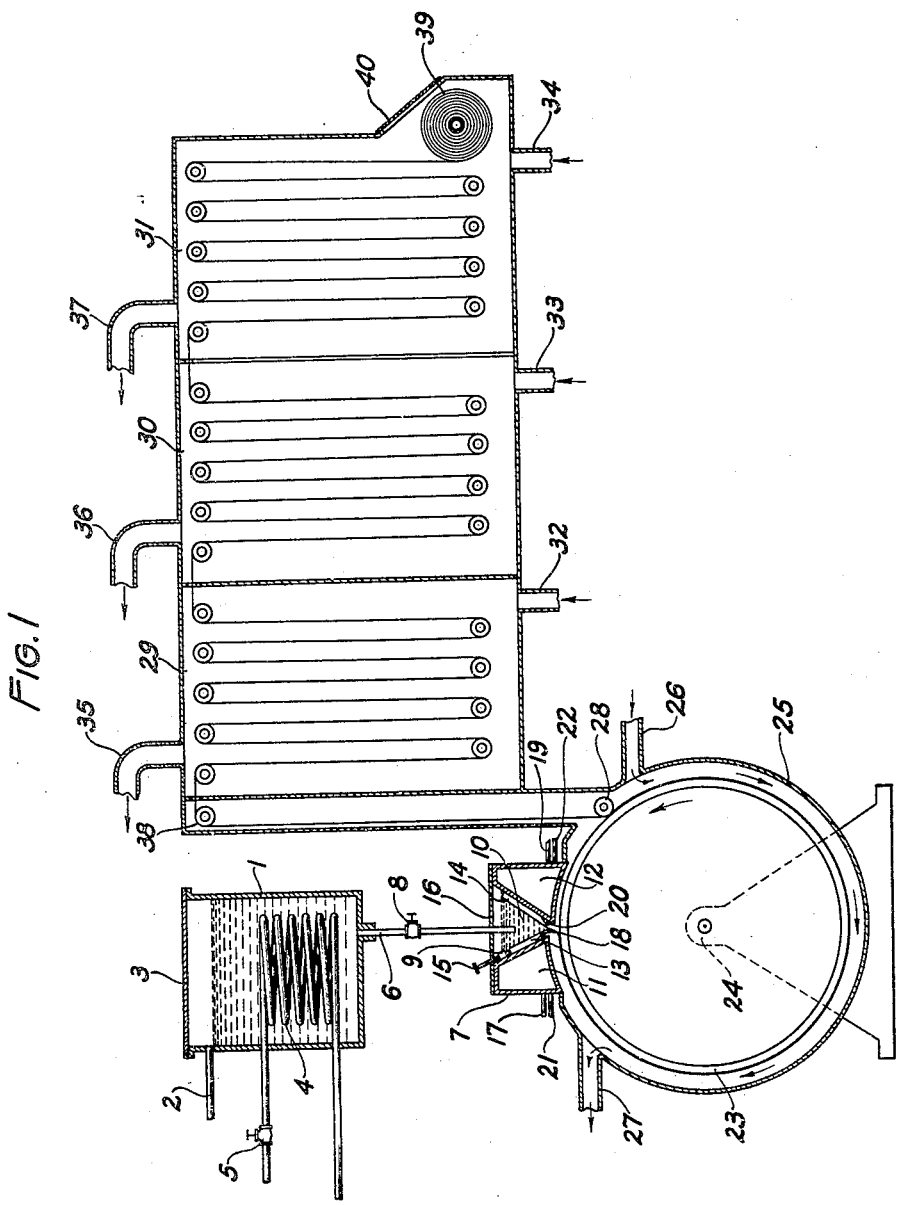

CELLULOSE ACETATE PROPIONATE IN ETHYLENE CHLORIDE, n-BUTYL ALCOHOL (10%), CYCLOHEXANE.

CELLULOSE ACETATE PROPIONATE IN ETHYLENE CHLORIDE, METHYL ALCOHOL (10%), CYCLOHEXANE.

CELLULOSE ACETATE PROPIONATE IN ETHYLENE CHLORIDE, n-BUTYL ALCOHOL (10%), METHYL CYCLOHEXANE.

WALKER F. HUNTER JR.
HOWARD A. TANNER
ROBERT E. GILLMOR
INVENTORS

CELLULOSE ACETATE PROPIONATE IN ETHYLENE CHLORIDE, n-BUTYL ALCOHOL (10%), "LIGROIN"

CELLULOSE ACETATE PROPIONATE IN ETHYLENE CHLORIDE, METHYL ALCOHOL (10%), "LIGROIN"

CELLULOSE ACETATE PROPIONATE IN ETHYLENE CHLORIDE, n-BUTYL ALCOHOL (10%), "HEXANE"

WALKER F. HUNTER JR.
HOWARD A. TANNER
ROBERT E. GILLMOR
INVENTORS

CELLULOSE ACETATE PROPIONATE IN PROPYLENE CHLORIDE, n-BUTYL ALCOHOL (10%), CYCLOHEXANE.

CELLULOSE ACETATE PROPIONATE IN CIS-DICHLORO ETHYLENE, n-BUTYL ALCOHOL (10%), CYCLOHEXANE.

CELLULOSE ACETATE BUTYRATE IN ETHYLENE CHLORIDE, n-BUTYL ALCOHOL (10%), CYCLOHEXANE (10%-50%).

WALKER F. HUNTER JR.
HOWARD A. TANNER
ROBERT E. GILLMOR
INVENTORS

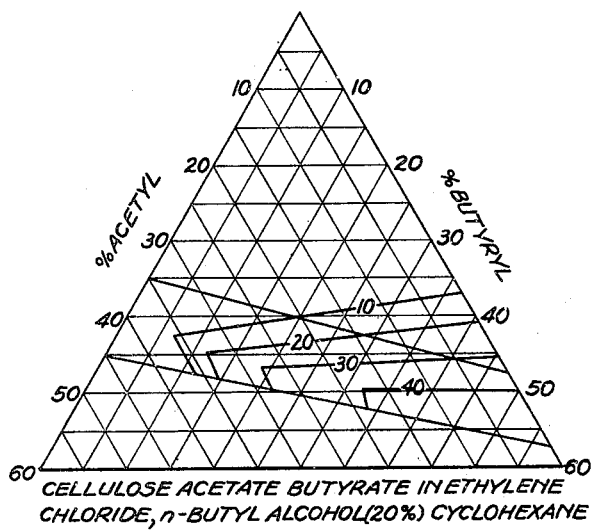
Fig. 11 — CELLULOSE ACETATE BUTYRATE IN ETHYLENE CHLORIDE, n-BUTYL ALCOHOL (20%) CYCLOHEXANE
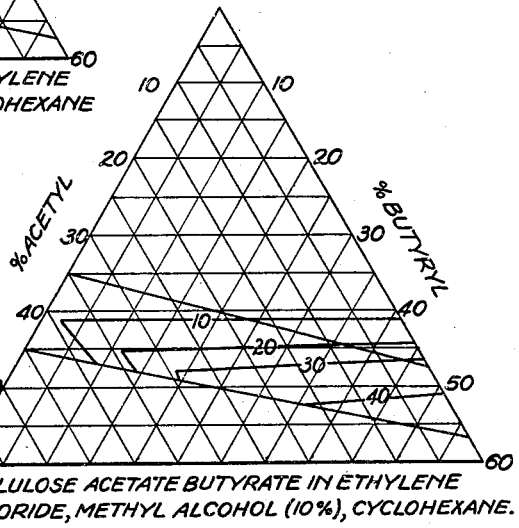
Fig. 12 — CELLULOSE ACETATE BUTYRATE IN ETHYLENE CHLORIDE, METHYL ALCOHOL (10%), CYCLOHEXANE.
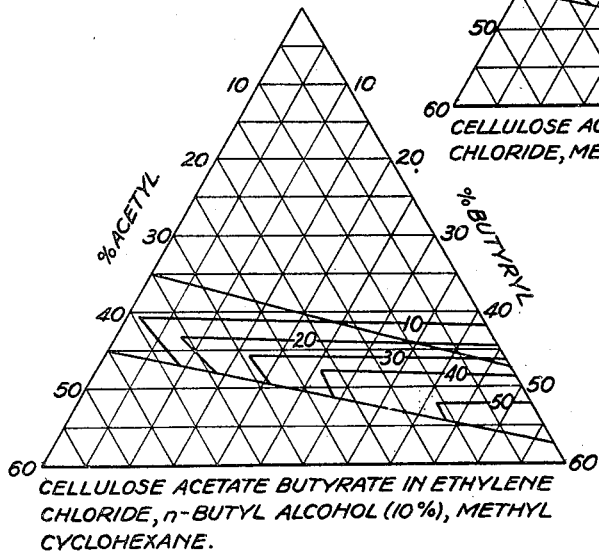
Fig. 13 — CELLULOSE ACETATE BUTYRATE IN ETHYLENE CHLORIDE, n-BUTYL ALCOHOL (10%), METHYL CYCLOHEXANE.
WALKER F. HUNTER JR.
HOWARD A. TANNER
ROBERT E. GILLMOR
INVENTORS

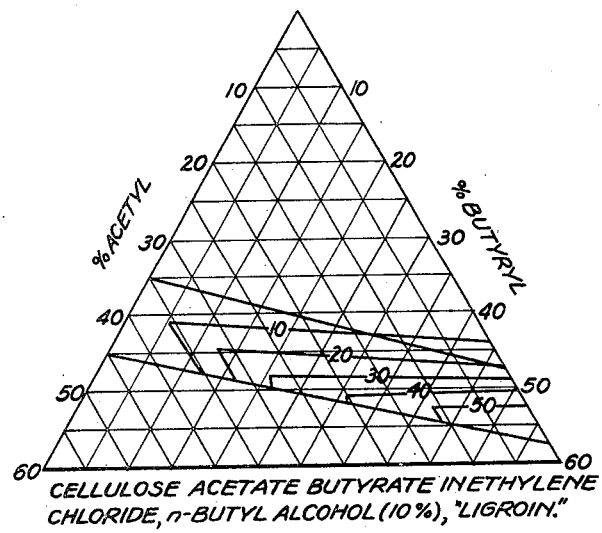
FIG. 14 — CELLULOSE ACETATE BUTYRATE IN ETHYLENE CHLORIDE, n-BUTYL ALCOHOL (10%), "LIGROIN."
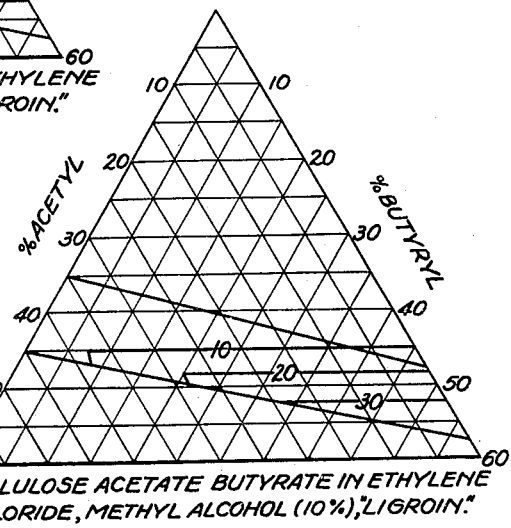
FIG. 15 — CELLULOSE ACETATE BUTYRATE IN ETHYLENE CHLORIDE, METHYL ALCOHOL (10%), "LIGROIN."
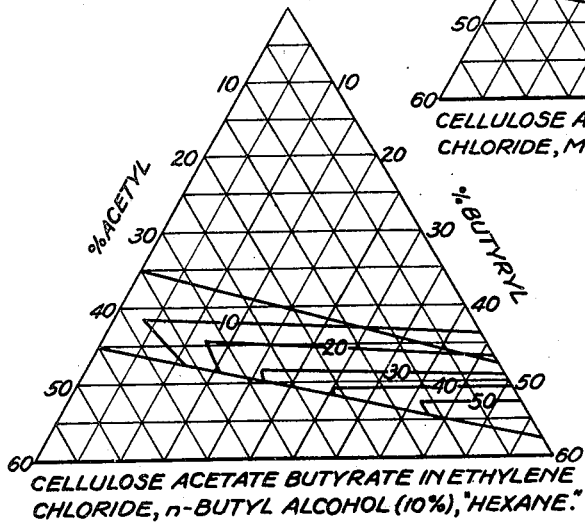
FIG. 16 — CELLULOSE ACETATE BUTYRATE IN ETHYLENE CHLORIDE, n-BUTYL ALCOHOL (10%), "HEXANE."

CELLULOSE ACETATE BUTYRATE IN PROPYLENE CHLORIDE, n-BUTYL ALCOHOL (10%), CYCLOHEXANE.

CELLULOSE ACETATE BUTYRATE IN CIS-DICHLORO ETHYLENE, n-BUTYL ALCOHOL (10%), CYCLOHEXANE.

WALKER F. HUNTER JR.
HOWARD A. TANNER
ROBERT E. GILLMOR
INVENTORS

Patented Jan. 16, 1945

2,367,503

UNITED STATES PATENT OFFICE 2,367,503

GELABLE CELLULOSE DERIVATIVE COMPOSITIONS

Walker F. Hunter, Jr., Rochester, N. Y., Howard A. Tanner, Newport, R. I., and Robert E. Gillmor, Kingsport, Tenn., assignors to Eastman Kodak Company, Rochester, N. Y., a corporation of New Jersey Original application August 1, 1940, Serial No. 349,370. Divided and this application October 12, 1942, Serial No. 461,686

4 Claims. (Cl. 106—189)

This invention relates to novel cellulose organic acid ester compositions adapted for the high speed manufacture of film base and similar products, and more particularly to compositions susceptible of gelation or solidification under various conditions of use.

As is well known, cellulose derivative sheets or films are ordinarily produced by depositing a cellulose derivative solution or dope in the form of a film on the highly polished surface of a slowly rotating wheel or band, causing the film to set by evaporation of solvent, stripping the film and curing our residual solvent. The compositions generally employed in the manufacture of films are of such nature that they attain a solid or semi-solid condition permitting removal of the material from the film-forming surface only by gradual evaporation of solvent. With such dopes, most of the solvent must be removed (leaving not much more than 20–25% of residual solvent, based upon the total weight of the film) before stripping of the film can be satisfactorily accomplished. This necessitates a relatively long period of preliminary curing on the wheel. Furthermore, the length of time required for proper setting is increased by the fact that, since such dopes remain fluid or semi-fluid until most of the solvent has evaporated (and, therefore, must be supported on the wheel surface), evaporation of solvent can take place only from the outside surface of the deposited film. In addition, such dopes tend to skin over on the outside surface because of more rapid loss of solvent from the upper layers of film material with the result that the solvent in the lower strata of the film encounters ever increasing resistance to escape, thus further increasing the setting time.

The advantages of bringing the film material into a solid or semi-solid condition which will permit it to be safely handled as early in the film-forming operation as possible are apparent. Obviously, any reduction in the stripping time, that is, the time during which the film must remain on the wheel before it is sufficiently self-supporting to permit proper stripping, directly increases production speed. Moreover, if the film can be removed from the wheel while still containing considerable solvent, more rapid curing can be attained, because in such condition solvent can be cured out of both surfaces of the film simultaneously. An additional advantage is that early solidification or colloidization results in a preferred micellar mat-like structure with attendant improvement in the quality of the finished product. The ideal film-forming operation would, therefore, be one in which the dope could be brought, immediately after casting, into a set or non-fluid condition while still containing all, or nearly all, of its original solvent—a condition which would permit almost immediate stripping (thus reducing stripping time to a minimum) and removal of solvent from both surfaces of the film simultaneously in the curing operation.

Numerous attempts have been made to realize this ideal. For example, it has been proposed to use mixtures of low and high-boiling solvents in the dope, so chosen that by rapidly evaporating the low boiling component a very concentrated solution of the cellulose derivative in the high boiling component would remain. It has also been proposed to coagulate cellulose derivative solutions by means of non-solvent liquids or vapors applied externally. While such expedients have resulted in some improvement, the ideal operation has never been attained in practice. However, as will be more fully set forth hereinafter, it is believed that the present invention comes nearer to a realization of this ideal than any previously known process.

As a further indication of the state of the art, it may be said that the broad phenomenon of gelation of certain types of cellulose derivative solutions under the influence of temperature change has been observed from time to time by various workers in the cellulose field. It has been recognized, for example, that certain organic liquids which are non-solvents for cellulose acetate and other cellulose organic acid esters at ordinary temperature become solvents at elevated or moderately elevated temperatures and that if solutions are formed at the high temperatures and coated on a metal or other surface and cooled down, a tenaciously adhering lacquer coating results. It has also been recognized that by heating a suspension of cellulose acetate in ethylene dichloride (a cellulose acetate non-solvent at ordinary temperatures) to about 30–60° C., the cellulose acetate dissolves to form a clear solution and when such a solution is coated on a surface, cooled and cured to remove the solvent, a clear transparent film results. In other words, while a hot ethylene chloride solution of cellulose acetate will gel upon coating or casting upon a film-forming surface, this phenomenon does not increase the speed of production of sheeting therefrom because such a film cannot be stripped and handled while containing any more solvent than is the case when films are formed from ordinary cellulose acetate dopes wherein acetone and like solvents are employed. In other words, the gel so formed is not self-supporting, nor does it have the relatively porous structure which permits ready loss of solvent in curing. Workers in this field have never gone much beyond a recognition of the phenomenon that certain dopes are capable of gelling and others are not.

This invention has as an object to provide gelable cellulose organic acid ester compositions. A further object is to provide cellulose ester compositions which are susceptible of gelling or setting, both by cooling the composition to within certain temperature ranges or by applying heat to such compositions to occasion selective evaporation of one of the solvents constituting a component of the compositions. A still further object is to provide cellulose ester compositions which are capable of gelling while containing all or nearly all of their original solvent content. Another object is to provide gelable cellulose ester compositions adapted for the high speed manufacture of film base and similar products. Other objects will appear hereinafter.

These objects are accomplished by the following invention which, in its broader aspects, comprises dissolving at elevated or moderately elevated temperatures certain cellulose organic acid ester such as cellulose propionates, cellulose butyrates and mixed esters such as cellulose acetate propionates and cellulose acetate butyrates in a solvent mixture comprising an alkylene chloride of 2 to 3 carbon atoms, a monohydric aliphatic alcohol of 1–5 carbon atoms and an aliphatic or alicyclic hydrocarbon boiling within the range of 50–110° C., thus obtaining a solution or dope useful for the manufacture of film base.

The outstanding and distinguishing feature of these dopes is the fact that they may be employed in the preparation of sheets or films by a casting method involving solidification or gelation either by lowering the temperature of the film-forming solution, or by a change in the non-solvent-to-solvent ratio of the solvent portion of the solution under the influence of an elevated temperature. In the language of practical film-forming manufacture, in accordance with our invention, one may employ either a hot or a cold wheel. In the hot wheel process, the dope maintained at a sufficiently elevated temperature to keep the material fluid, is caused to flow onto the warm film-forming surface in such uniform thickness that, upon evaporation of the volatile components of the solvent mixture, a uniform transparent film is obtained. We have found that certain solvent mixtures are particularly advantageous for this operation, since during evaporation of the more volatile constituents a setting or gelation takes place in the compositions, resulting in unusually high speeds of operation and especially desirable physical properties in the resulting film. In accordance with the cold wheel process, the dope, maintained at a sufficiently elevated temperature to assure fluidity, is caused to flow onto a cool film-forming surface where, under the influence of the reduced temperature, the composition immediately sets or gels to a non-fluid state, after which when only a comparatively small proportion of the volatile solvents have been evaporated, the film may be removed from the coating surface, thus making possible very high speeds of operation.

When employing either of these two processes, the film is susceptible of being stripped from the film-forming surface within a much shorter time than is possible when using the ordinary evaporative dopes. To express it in slightly different language, the time that the dope must remain on the wheel before stripping can be satisfactorily accomplished, is much less than is required in the case of evaporative type dopes.

In the accompanying triangular diagrams or charts which will be more fully commented on hereinafter, we have graphically illustrated the various cellulose organic esters which may be employed in accordance with our invention.

It will be understood from these charts that the cellulose esters which may be employed are cellulose propionates and cellulose butyrates or cellulose acetate propionates and cellulose acetate butyrates containing at least approximately 5% propionyl or butyryl groups and having not less than about 40% total acyl content, or more specifically, those cellulose organic acid esters having compositions indicated by the areas shown on the charts, and operative with varying quantities of hydrocarbons as indicated.

It will be recognized that the solvents employed in preparing solutions within the scope of our invention bear an interrelation to each other and for best results should be so chosen that they give proper behaviour each in relation to the other and in relation to the cellulose derivative to be employed.

The alkylene chlorides most suitably used for our purpose are ethylene chloride or propylene chloride and will normally comprise 40–80% by weight of the solvent composition. The alcohol may be one or more of the aliphatic alcohols of 1–5 carbon atoms and will normally be present in a quantity of 5–30% of the solvent mixture. The hydrocarbon fraction may be an aliphatic hydrocarbon or a mixture of such hydrocarbons (as obtained from petroleum fractions and commonly known as ligroin or petroleum ether) or cyclohexane or methyl cyclohexane. This portion of the composition may vary from about 10 to about 50% of the total solvent composition.

If the hydrocarbon fraction of the solvent composition is chosen from those having a boiling temperature near the upper limits of our operating range, it will be advisable to employ a comparatively high boiling alcohol for the composition to prevent blushing upon solvent evaporation. The lower alcohols are normally more effective in giving reduced solution viscosity and increased solubility, while alcohols of higher boiling points tend to prevent the hydrocarbons from causing blushing or precipitation during evaporation. With more volatile alkylene chlorides such as ethylene chloride and a hydrocarbon of intermediate volatility such as would be obtained with cyclohexane, about 10% normal butyl alcohol has been found to give outstanding results. In regard to adjustment of the solvent composition for the cellulose ester employed, increased propionyl or butyryl content of cellulose esters results in increased hydrocarbon tolerance and would therefore permit the use of higher concentrations of these solvents.

For any given propionyl or butyryl content, fully esterified products will generally tolerate higher concentrations of hydrocarbons than those which have been hydrolyzed. The determining factor for maximum hydrocarbon content of useful solutions is often for prevention of blush in films from such solutions rather than solubility of the cellulose ester. Higher quantities of hydrocarbons than indicated on the triangular charts can often be included in solutions of the cellulose esters, but upon coating films blushing will be found to occur.

In coating films from these solutions high humidities cause an increased tendency toward development of blush, and for best results should be avoided. The temperature of the film casting surface is also a factor in development of blush, showing greater tendency in this direction as the coating surface temperature is increased.

The solutions or dopes of our invention are of such nature that they are liquids at temperatures above 50° C., but are susceptible of gelation upon an appropriate lowering of the temperature of the solution, for example, to within the range of 10° C. or somewhat lower, to 50° C. As previously indicated, these dopes also set or gel by evaporation of one or more components of the solvent mixture in which the cellulose ester in question is dissolved. This latter phenomenon may be referred to as "selective evaporation" and the dopes may be referred to as also of the selective evaporation type, as distinguished from straight evaporative dopes, that is, dopes which are susceptible of solidification only by loss of solvent by evaporation.

It will thus be seen that the solutions or dopes of our invention are susceptible of solidification or gelation in a very wide range of temperatures, that is, temperatures all the way from the lowest practical temperatures to employ in connection with the temperature gelation procedure up to the highest practical temperature in connection with the selective evaporation procedure. On the one hand, the lower temperature limit is governed by practical considerations such as the expense and difficulties involved in refrigerating or cooling the film-casting surface and, on the other hand, by the necessity of avoiding the formation of bubbles in the dope. While no hard and fast rule can be laid down with respect to the lower limit of temperature which may be in the vicinity of 10° C. or even considerably lower, it may be said that the practical upper limit of temperature would not exceed about 65° C.

Reference has been made above to the use of a cold wheel or a hot wheel. It is of course to be understood that these terms are relative and that the wheel or casting surface is said to be cold when it is below the gelation temperature of the particular dope undergoing casting. Conversely, the wheel surface is said to be hot when it is above the gel temperature (referred to temperature gelation) of the dope.

In using the dopes of our invention under the selective evaporation process, that is, by employing a hot or warm wheel surface, we have found that the hydrocarbon non-solvent component of the solvent phase is less readily evaporated or driven off from the forming film than is the solvent component with the result that the non-solvent immediately begins to build up in the dope until the composition reaches a condition in which it passes over rather suddenly into a solidified form. This is a case of typical gelation, since solidification is brought about by means of a change in the composition of the solvent phase of the dope, as distinguished from temperature gelation in which solidification of the film is brought about solely by lowering the temperature. Thus it will be seen that in the selective evaporation process the dopes solidify or set to a gel by loss of solvent, whereas in the temperature gelation process the film solidifies or gels while containing substantially all or a large proportion of its original solvent.

To take a specific case, a dope prepared by dissolving a low viscosity cellulose acetate butyrate containing 30.2% acetyl and 16.7% butyryl in a solvent-to-solid ratio of 3.75 to 1 in a solvent mixture composed of 65% ethylene chloride, 10% n-butyl alcohol and 25% cyclohexane, when cast in the form of a film on a wheel surface having a temperature of about 40° C., forms a clear, transparent film of sufficient strength as to permit removal after a period of three minutes. Whereas the ratio of cyclohexane (non-solvent) to the solvent (ethylene chloride-n-butyl alcohol) of the original dope was 1 to 3, in the film as stripped, this ratio had been shifted in favor of the cyclohexane to a ratio of about 1 to 2. It is during the early stages of loss of the active solvent portion of the solvent mixture in the dope that the solution reaches a condition in which it solidifies or coagulates into a solid or semi-solid self-supporting gel. It will thus be seen that solidification or coagulation of the dope occurs under the selective evaporation process by what may be referred to as "unbalancing" of the solution by an increase in the non-solvent-to-solvent ratio, the solution thereby losing its ability to remain in the liquid state. This is, as stated, an instance of true gelation, and is clearly to be distinguished from precepitation from solution by the addition of a non-solvent, since in gelation no precipitation of discrete portions of the cellulose ester takes place, but a uniform solidification of the whole composition into a clear, transparent film-like solid occurs.

Reference has been made above to the nature of the film-forming compositions employed in accordance with our invention as compared to the ordinary or evaporative types of film-forming dopes. It may again be pointed out that one of the distinguishing features of the compositions of our invention is that they set, solidify, or gel because of some internal readjustment in the relationship between the cellulose ester in solution and the solvent which is present which causes the solidified material to assume a rigid or semi-rigid condition permitting the structure to be self-supporting. This phenomenon clearly distinguishes such compositions from the ordinary or evaporative type of dopes which, with the same residual solvent content, remain in a fluid, semi-fluid, or at least a sticky, substantially non-rigid condition. It should also be pointed out that our compositions are characterized by the fact that they undergo this setting phenomenon regardless of whether it is induced under the influence of a lowering of the temperature of the solution (temperature gelation), or by a change in the non-solvent-to-solvent ratio of the solvent mixture in which the cellulose ester is dissolved (selective evaporation).

In the following examples and description we have set forth several of the preferred embodiments of our invention but they are included merely for purposes of illustration and not as a limitation thereof.

In the accompanying drawings:

Fig. 1 is a diagrammatic elevational sectional view of a conventional type of apparatus which may be employed for carrying out film-forming operations in accordance with our invention.

Figures 2-9, inclusive, are triangular coordinate diagrams illustrating the composition of typical film-forming solutions prepared from cellulose acetate propionate in accordance with our invention.

Figures 10-18, inclusive, are also triangular coordinate diagrams illustrating similar compositions prepared from cellulose acetate butyrate.

While the charts of Figures 2-18 are more or less self-explanatory, it will be desirable at this point briefly to indicate the nature of the compositions in question by reference to a specific example.

Figure 2:
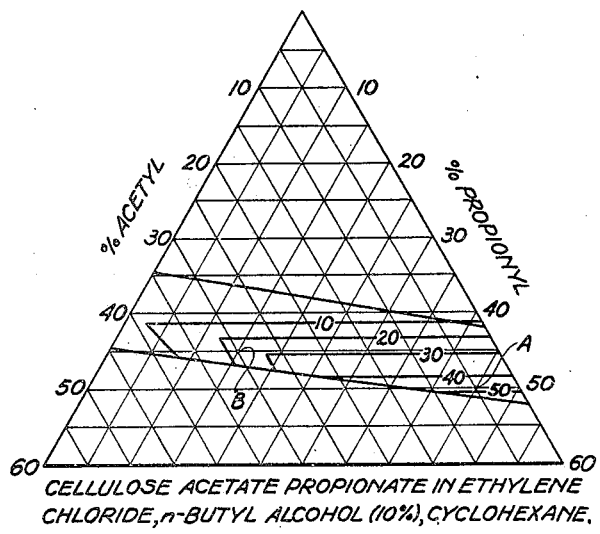
Figure 3:
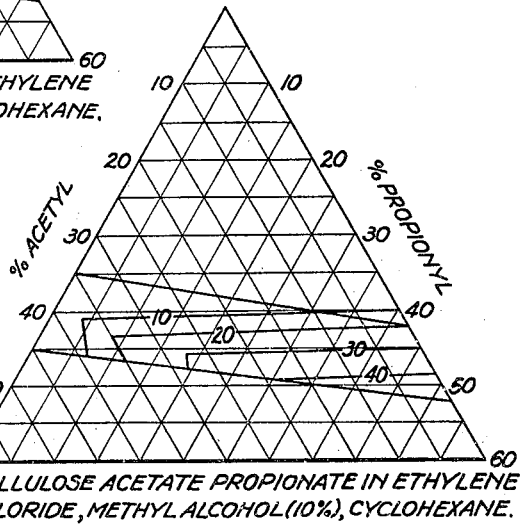
Figure 4:
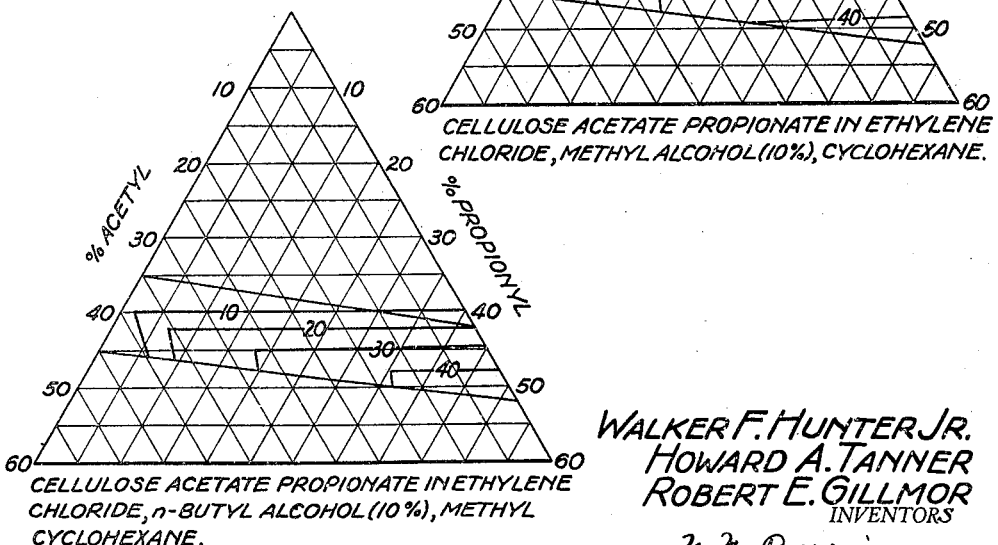
Figure 5:
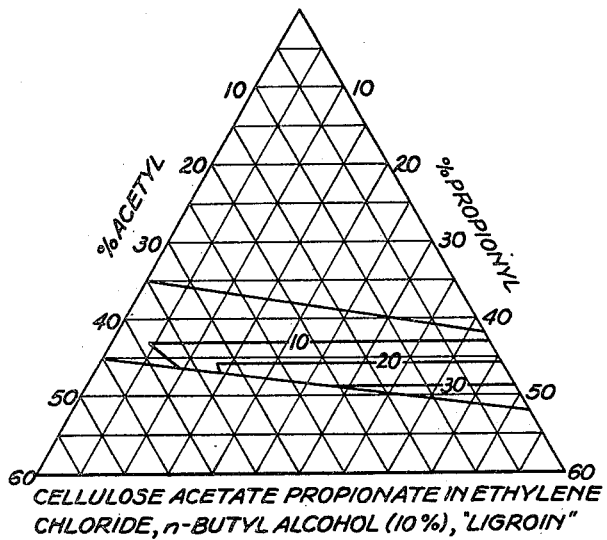
Figure 6:
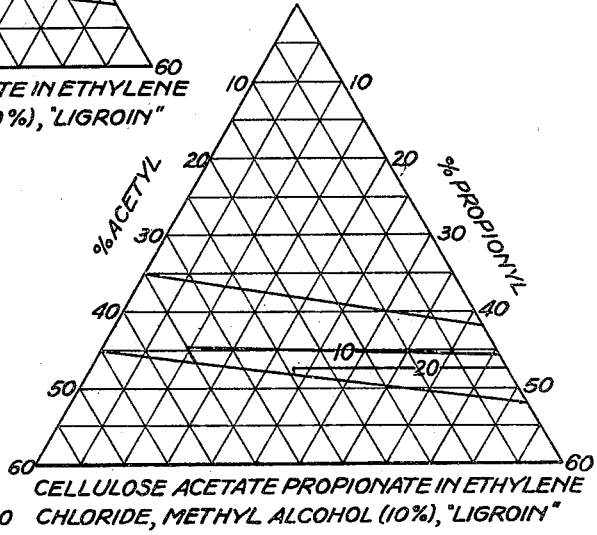
Figure 7:
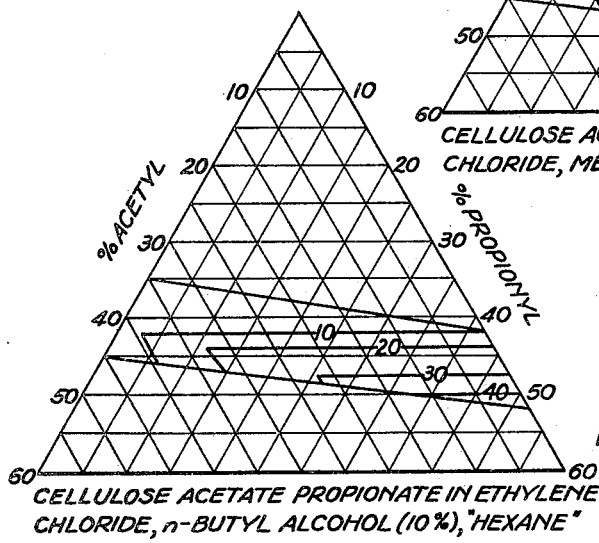
Figure 8:
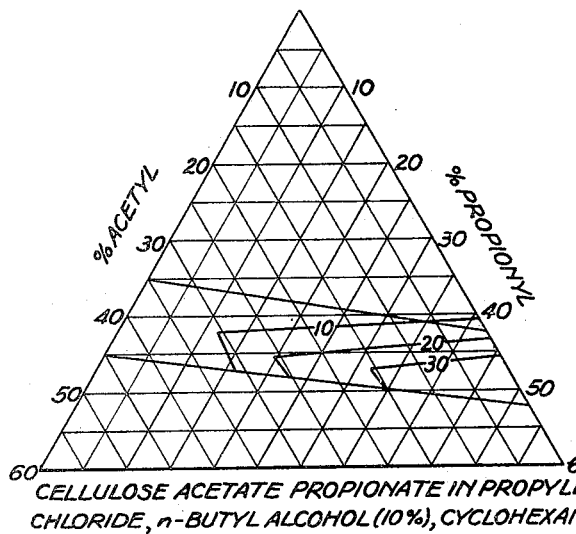
Figure 9:
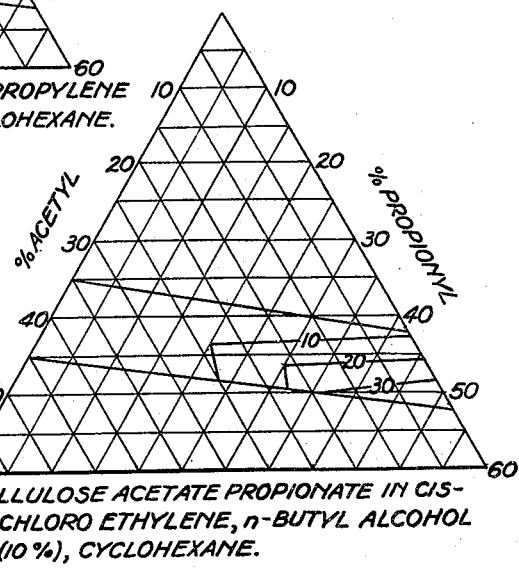
Figure 10:
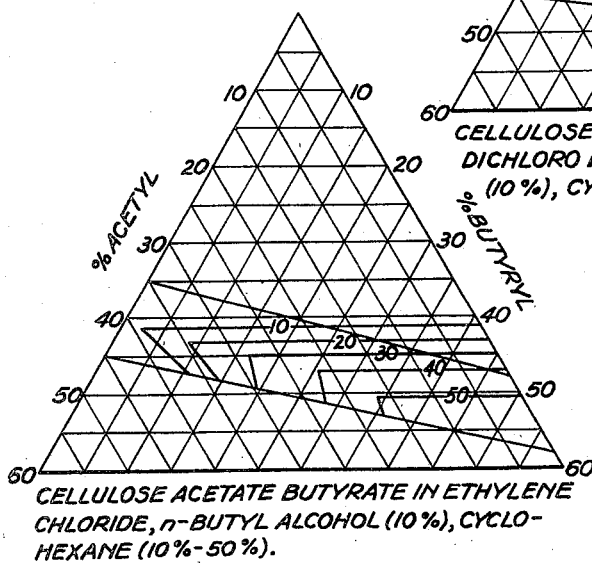
Figure 17:
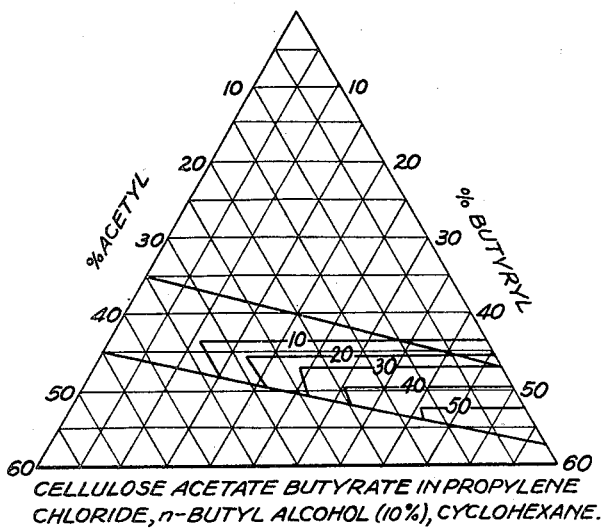
Figure 18:
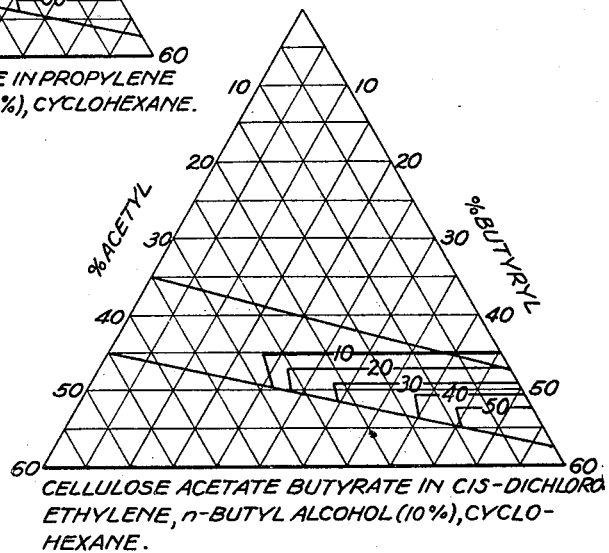

For example, Fig. 2 shows the limits of cyclohexane content which may usefully be employed with cellulose acetate propionate in solvent mixtures made up of ethylene dichloride, normal-butyl alcohol and cyclohexane, where the alcohol comprises 10% by weight of the solvent mixture. A cellulose acetate propionate, containing, for example, 5% acetyl and 45% propionyl (shown as point "A" on the diagram) can be coated from a solvent mixture containing 10% normal-butyl alcohol and up to almost 50% cyclohexane, the remainder of the solvent being ethylene chloride. Similarly, an acetate propionate containing 30% acetyl and 15% propionyl (shown as point "B" on the diagram) can be coated from solvent mixtures made up of 10% normal-butyl alcohol, not more than about 22% cyclohexane and at least 68% ethylene chloride.

Before giving specific examples of our invention, it is desirable to describe the general aspects of a typical film or sheet-forming process in accordance therewith and one type of appropriate apparatus for carrying it out.

Referring to Fig. 1 of the drawings, numeral 1 designates a dope storage or supply tank provided with an inlet conduit 2 for admission of the previously-prepared dope. The tank is provided with a removable cover 3 for permitting inspection of the contents and a coil 4 through which an appropriate heat exchange fluid may be circulated, the rate of flow being regulated by means of thermostatically controlled valve 5. The flow of fluid and the temperature thereof may be regulated in such manner as to maintain the body of dope in the tank 1 at any desired constant temperature.

Numeral 6 designates a conduit (which may be provided with appropriate lagging to prevent heat losses) through which the dope is passed to a dope hopper 7, flow of the dope being controlled by means of valve 8.

The dope hopper may be of the standard type, but is preferably of a form adapted to be raised an appreciable distance from the casting wheel and thus to permit the dope stream to run for a short distance unsupported before impinging upon the film-forming surface. This preferred type of hopper which also provides a baffled space on either side of the dope stream at the point of extrusion, is illustrated in Fig. 1 and comprises essentially a V-shaped trough 10, preferably provided on either side with chambers or jackets 11 and 12 through which may be circulated a suitable heat exchange fluid to maintain the dope in the hopper at any desired constant temperature.

The hopper is also provided with an adjustable gate member or blade 13 which, by adjustment with relation to a fixed blade 14, controls the thickness of the dope stream. Adjustment of the gate member 13 is provided for through one or more thumb screws 15 threaded through appropriate lugs 9 forming a part of the hopper wall. The hopper may also be provided with a cover 16 for preventing loss of solvent from the body of dope contained therein. The dope is maintained at a constant level in the hopper through suitable adjustment or control of the valve 8.

Depending upon the particular method of handling the dope in accordance with our invention, as will be more particularly described hereinafter, it may be desirable to maintain a high concentration of solvent vapor on both sides of the dope stream as it emerges from the hopper to prevent accretions of solidified dope or "slugs" from forming at the lower end of the blades 13 and 14 or on contiguous parts of the hopper. When this is desirable, solvent vapor may be fed into the space just below the blade 13 by means of conduit 17 leading through the hopper wall and feeding through port 18. A similar stream of vapor may be fed to the opposite surface of the dope stream through conduit 19 and port 20. If desired, the vapor may be heated by a suitable fluid such as steam or hot water supplied through conduits 21 and 22 positioned in the hopper wall in proximity to vapor conduits 17 and 19, respectively. This particular hopper construction, providing for the raising of the blades a considerable distance above the wheel surface and providing a baffled space for confinement of solvent vapors in the immediate vicinity and on both sides of the dope stream forms no part of the instant invention, but is the invention of Charles R. Fordyce, Walker F. Hunter, Jr., and Karl G. Pleger, and is described and claimed in their copending application Ser. No. 335,336, filed May 15, 1940. An alternate form of hopper in which solvent in liquid form may be fed directly to the back blade of the hopper and also providing a baffled space on either side of the dope stream may be employed if desired. Such a hopper is described and claimed in the copending application of Charles R. Fordyce, Ser. No. 335,335, filed May 15, 1940.

Positioned below hopper 7 is coating or casting wheel 23 mounted in suitable bearings 24 and surrounded by air casing 25, the wheel being adapted to rotate in the direction indicated by the arrow. The wheel is provided with appropriate cooling means (not shown) whereby its film-forming surface may be cooled, if desired, to an appropriate temperature equal to or below the gelation temperature of the particular dope employed. Casing 25 is provided with air inlet conduit 26 and outlet conduit 27 for conducting a current of heated air around the wheel countercurrently to the path of the film undergoing formation. The wheel is driven by appropriate mechanism (not shown) of such nature that any desired rotational speeds may be attained.

Numeral 28 designates a conventional stripping roll over which the formed film passes on its way to the curing device, which preferably comprises a plurality of air sections 29, 30, and 31. These air sections are provided, respectively, with air inlet conduits 32, 33, and 34, and with air outlet conduits 35, 36, and 37, providing a means of conducting heated air into and through each section in the general direction indicated by the arrows.

Numeral 38 designates a guide roll over which the film passes, after leaving stripping roll 28, on its way to the first air section. Each air section is provided with a series of rolls as illustrated which provide an extensive and circuitous path which the film follows during the curing process. These rolls are driven, preferably by means of the so-called tendency drive, which permits the film to travel through the air sections in a substantially freely supported condition. This type of drive compensates for any tension which may be set up by longitudinal changes of dimensions taking place in the film material by loss of solvent and shrinkage during the curing operation. Numeral 39 designates a windup roll on which the cured film is accumulated. The film may be conveniently removed from the apparatus through hinged door 40 giving access to the last air section in the manner illustrated.

Our invention will now be more fully explained by reference to specific examples of processes carried out in accordance therewith.

Example 1

A solution of 100 parts by weight of a cellulose acetate propionate of 29% acetyl and 15% propionyl content in 500 parts by weight of a solvent mixture composed of 75% ethylene chloride, 10% butyl alcohol and 15% ligroin (boiling point 90–100°) was prepared by mixing the ingredients at 60° C. There was then added 12 parts by weight of triphenyl phosphate. The resulting solution was maintained at approximately 50° C. and coated onto a film-forming surface maintained at about 40° C. After about 6 minutes the film had cured sufficiently that it could be removed from the coating surface and further cured in a current of warm air.

The completely cured film was .005" thick and was found to have an average tensile strength of 18.5 kgs. and a flexibility of 24 Schopper folds. Its swell and shrink amplitude was .76%.

Example 2

A solution of 100 parts by weight of a cellulose acetate butyrate containing 30.2% acetyl and 16.7% butyryl in 330 parts by weight of a solvent mixture composed of 65% by weight of ethylene chloride, 10% normal butyl alcohol, and 25% cyclohexane and containing 10% triphenyl phosphate, based on the weight of the cellulose ester, was prepared by mixing the ingredients with continued stirring at 60° C. The solution was then filtered to remove incompletely dissolved particles and fed to the supply tank of a film forming apparatus such as that illustrated in Fig. 1. The temperature of the dope in the tank was maintained at 60° C.

The dope was admitted to the hopper where its temperature was maintained at about 50° C. The gate of the hopper was so adjusted as to feed a stream of dope to the wheel surface in such an amount as to give a final film thickness of .008 inch, the wheel being maintained at a temperature of about 40° C. The wheel was rotated at a speed such that the film remained on the film-forming surface for about six minutes, during which time a current of air having an air inlet temperature of about 60° C. was passed through the space around the wheel in a direction countercurrent to that of the movement of the film.

After completing somewhat more than three-quarters of a revolution on the wheel, the film was stripped from the film-forming surface and was thereafter carried through the air sections where it was subjected to the curing action of a current of moderately heated air. The air passing through the air sections had an average temperature of about 110° C. The path and speed of the film were such that any given portion thereof remained in the air sections for approximately an hour and a half.

The finished film had a tensile strength of 21.0 kgs. for a test strip 15 mm. wide. The elongation before break was 48.7%. The flexibility was 47 folds. The film obtained had the important property of being uniaxial, or similar in properties measured parallel to and perpendicular to the direction of coating. It is especially desirable to have the swell and shrink amplitude nearly the same along and across the direction of coating. The film obtained in this experiment had a swell and shrink amplitude along the direction of coating of .38% and across the direction of coating it was .37%. This shows a high degree of uniaxialism.

Example 3

A solution of 100 parts by weight of a cellulose acetate butyrate containing 30.1% acetyl and 16.7% butyryl in 300 parts by weight of a solvent mixture composed of 68% by weight of ethylene chloride, 10% normal butyl alcohol, and 22% cyclohexane and containing 7% triphenyl phosphate, based on the weight of the cellulose ester, was prepared at 60° C., filtered, and fed to the supply tank of the film-forming apparatus. The dope was kept at around 60° C.

The dope was admitted to the hopper where the temperature was about 50° C. The gate of the hopper was so adjusted as to feed a stream of dope to the wheel surface in such an amount as to give a final film thickness of .008 inch. The temperature of the wheel surface was maintained at 18° C. It had previously been determined that the dope would set to a solid gel when cooled below 27° C. Upon contact with the wheel surface the dope was transformed to a non-fluid gel. The speed of the wheel was such that the film remained in contact with the coating surface about six minutes. The film was then stripped from the coating surface and carried through the air sections of the machine, the temperature of the first section was about 45° C. and the film remained in it for 16 minutes. In the second section the film was cured for 16 minutes at 65° C. In the third section the film was cured for 16 minutes at 80° C. In the remainder of the curing process the temperature was about 110° C. The whole curing process consumes one and a half hours.

The finished film had a tensile strength of 25.4 kgs., and an elongation before breaking of 48.2%. The flexibility was 46 folds. The swell and shrink amplitude was .40 along the direction of coating and .46 across the direction of coating.

Example 4

A solution of 100 parts by weight of a cellulose acetate butyrate containing 30.2% acetyl and 16.7% butyryl in 330 parts by weight of a solvent mixture composed of 65% by weight of ethylene chloride, 10% normal butyl alcohol, and 25% methyl cyclohexane and containing 10% by weight of triphenyl phosphate based on the weight of the cellulose ester was prepared at 60° C., filtered and supplied to the supply tank of the film-forming apparatus.

The coating procedure was the same as that described in Example 2.

The film obtained had a tensile strength of 22.4 kgs. and an elongation before breaking of 38.3%. The flexibility was 56 folds and the swell and shrink amplitude along the direction of coating was .28%.

Example 5

A solution of 100 parts by weight of a cellulose acetate butyrate containing 19.2% acetyl and 27.0% butyryl in 460 parts of a solvent mixture composed of 65% by weight of ethylene chloride, 10% anhydrous iso-propyl alcohol, and 25% cyclohexane and containing 25% by weight of dibutyl phthalate, based on the weight of the cellulose ester, was made up at 60° C., filtered, and fed to the supply tank of the film-forming apparatus.

The coating wheel was maintained at 40° C. and the film was stripped from it after approximately 2 minutes. The thickness of the cured film was .001".

Example 6

A solution of 100 parts by weight of a cellulose acetate butyrate containing 30.2% acetyl and 16.7% butyryl in 320 parts by weight of a solvent mixture composed of 65% by weight of ethylene chloride, 10% anhydrous ethyl alcohol, and 25% cyclohexane and containing 10% by weight of triphenyl phosphate based on the weight of the cellulose ester was made up at 60° C., filtered, and fed to the supply tank of the film-forming apparatus.

The coating was carried out under the same conditions as in Example 2 except that the speed was slightly lower, the film being left on the coating surface for about 7 minutes before stripping.

The finished film had a thickness of .0085". The tensile strength was 28.3 kgs. and the elongation was 40.2%. The flexibility was 33 folds. The swell and shrink amplitude along the direction of coating was .31% and across it was .35%.

Example 7

A solution of 100 parts by weight of a cellulose acetate butyrate containing 33.4% acetyl and 10.9% butyryl in 580 parts of a solvent mixture composed of 70% ethylene chloride, 10% normal butyl alcohol, and 20% cyclohexane and containing 10% triphenyl phosphate based on the weight of the cellulose ester was made up at 60° C., filtered, and fed to the supply tank of the film-forming apparatus.

The coating wheel was maintained at 46° C. and the dope was flowed on to produce a film having a final thickness of .0055". The film was stripped from the coating surface after 8.5 minutes. The film was cured as in Example 2.

The final product had a tensile strength of 16.6 kgs. and an elongation of 45%. The flexibility was 16 folds. The swell and shrink amplitude was .81% along the direction of coating and .89% across the direction of coating.

The above examples help to make clear the advantages to be obtained through the use of solvent mixtures of the type we have described. The film can be removed from the coating surface, even under unfavorable conditions, generally in at least half the time necessary with dopes prepared from ordinary solvents such as acetone, propylene chloride mixed with alcohol, and ethylene chloride. The film obtained has physical properties outstandingly better than those obtained with ordinary solvents, particularly with respect to the properties of uniaxialism and low swell and shrink amplitude.

The following examples further indicate the variations which may be made in the solvent composition and the composition of the cellulose ester. The "stripping time" is the time in minutes which must elapse after the dope has been spread on the coating surface until the resultant film can be removed unblemished. The final thickness of the film in each case was .0055". In all of these examples the coating surface was kept at 40° C. and the dopes were made up at 60° C. and kept at 50° C. until used. The gel temperatures, at which temperature the dope sets to a solid gel are also given.

| Example No. | Cellulose ester | | | Solvent | Ratio of solvent to ester | Strip time | Gel temp. |
|---|---|---|---|---|---|---|---|
| | Per cent ac. | Per cent prop. | Per cent bu. | | | | °C. |
| 8 | 35.3 | | 10.9 | 80% ethylene chloride<br>10% methyl alcohol<br>10% ligroin | 6:1 | 7.0 | Below 70 |
| 9 | 13.0 | | 37.0 | 65% ethylene chloride<br>10% n-butyl alcohol<br>25% ligroin | 4:1 | 5.5 | 70 |
| 10 | 26.8 | | 22.2 | 60% ethylene chloride<br>10% n-butyl alcohol<br>30% hexane | 4:1 | 2.0 | 28 |
| 11 | 19.2 | | 27.0 | 50% ethylene chloride<br>20% n-butyl alcohol<br>30% cyclohexane | 4:1 | 3.3 | 10 |
| 12 | 26.8 | | 22.2 | 65% ethylene chloride<br>10% methyl alcohol<br>25% cyclohexane | 4:1 | 5.5 | 7 |
| 13 | 13.0 | | 37.0 | 55% propylene chloride<br>10% n-butyl alcohol<br>35% cyclohexane | 4:1 | 6.5 | Below 7 |
| 14 | 19.2 | | 27.0 | 80% cis dichloroethylene<br>10% n-butyl alcohol<br>10% cyclohexane | 4:1 | 5.5 | Below 7 |
| 15 | 29.3 | 15.0 | | 70% ethylene chloride<br>10% n-butyl alcohol<br>20% methyl cyclohexane | 5:1 | 5.0 | 8 |
| 16 | 23.4 | 21.3 | | 70% ethylene chloride<br>10% n-butyl alcohol<br>20% hexane | 5:1 | 5.0 | 10 |
| 17 | 9.1 | 39.2 | | 60% propylene chloride<br>10% n-butyl alcohol<br>30% cyclohexane | 4:1 | 6.5 | Below 7 |
| 18 | 30.2 | | 16.7 | 65% ethylene chloride<br>10% n-butyl alcohol<br>25% cyclohexane | 3.5:1 | 3.0 | 29 |
| 19 | 30.2 | | 16.7 | 60% ethylene chloride<br>20% n-butyl alcohol<br>20% cyclohexane | 3.5:1 | 2.7 | 29 |
| 20 | 30.2 | | 16.7 | 75% ethylene chloride<br>5% n-butyl alcohol<br>20% cyclohexane | 3.5:1 | 3.0 | 21 |
| 21 | 2.5 | 49.3 | | 50% ethylene chloride<br>10% n-butyl alcohol<br>40% cyclohexane | 4:1 | 5.0 | Below 7 |
| 22 | 2.2 | | 51.3 | 40% ethylene chloride<br>10% n-butyl alcohol<br>50% cyclohexane | 4:1 | 4.0 | Below 7 |
| 23 | 16.2 | | 36.0 | 70% trichloroethylene<br>10% n-butyl alcohol<br>20% cyclohexane | 5:1 | 3.5 | 20 |

Of the above examples we have found that the processes of Examples 1, 3, and 7 are outstandingly satisfactory from the standpoint of high speed film formation.

The hexane used in the preparation of the compositions of certain of the above examples was a petroleum fraction boiling at 62-67° C. The ligroin was in each case a petroleum fraction boiling at 90-100° C.

One of the most outstanding differences between films or sheets produced in accordance with our invention, and prior art products produced from evaporative dopes, is the fact that they have an extremely low "swell and shrink amplitude," that is, the property of undergoing linear dimensional change in alternately wet and dry condition. As is well known, the swell and shrink characteristics of a photographic film, for example, are of great importance and the most useful films are those having the lowest swell and shrink amplitude. This is of particular importance in films which are to be used for X-ray, portrait, or aerial photography, where sheets of appreciable size are employed. Obviously films of high swell and shrink characteristics tend toward internal unevenness which is due, either to buckling of the film in the center, or to curling of the edges—phenomena which are absent from films having a low swell and shrink amplitude and the ability to lie flat without curling. Other types of film which are used in long strips, such as rolls of Cine films, are difficult to process—such materials if of high swell and shrink characteristics, exhibiting appreciable shrinkage after removal from developing or washing solutions, at which time the films are usually mounted on a drying rack. Under such conditions these films tend to become severely tightened resulting in distortion of the film base and the photographic image carried thereby.

It has been proposed to reduce the tendency of such films to swell and shrink by incorporating therein a fairly large amount of a water-repellent plasticizer. However, the use of such a plasticizer in amounts sufficient to reduce the swell and shrink tendency to any appreciable extent has a detrimental effect on the physical properties of the film, causing a loss in tensile strength and an increase in a stretch. Another alternative is to employ a mixed cellulose organic acid ester and introduce into such ester a relatively high proportion of higher acyl groups. This method, similarly to the introduction of a high proportion of plasticizer, is also unsatisfactory, since, when an appreciable reduction in swell and shrink is obtained, a definite loss in tensile strength occurs and the resulting film is too limp for satisfactory use.

It is one of the features of our invention that we are enabled to produce a film or sheet from a cellulose mixed organic acid ester of the various types, having good tensile strength and durability and containing, for example, as little as 10% or less, based on the weight of the ester, of a plasticizer, and obtain material having an unexpectedly low swell and shrink amplitude ranging from about .4% to about .8%, in most cases less than .8% hitherto unattainable results. In fact, these same materials when coated by conventional methods give swell and shrink amplitudes from 20% to 100% greater than the values obtained by our method. In other words for any given plasticizer content and a given ester, we are enabled to obtain a film having a markedly lower swell and shrink amplitude than that of a film produced from the same ester by the evaporative method of solidification, also a hitherto unattainable result.

As a further example of the improved results obtainable by our process, we are enabled to produce a sheet or film adapted for use as photographic film base from cellulose organic acid esters with or without a plasticizer, having a swell and shrink amplitude below about .8%, which value is at least 20% less than that which would be obtained if the same film material were dissolved in solvents at room temperature, coated, for example, on a glass plate to the same thickness, set or solidified by evaporating the solvent in dry air at room temperature, and curing in an oven at elevated or moderately elevated temperature.

While we do not confine ourselves to any particular theory or explanation of the results obtained, it appears that both the facility and speed with which our new products may be removed from the film-forming surface and their specific physical properties, particularly high tensile strength and flexibility and extremely low swell and shrink amplitude, are due to the fact that they set to a non-fluid state before curling. It is possible that the low linear dimensional change taking place when such films are alternately wet and dry may be due to a change in thickness rather than to a change in the length of the film on absorption of moisture, the swell and shrink very probably being dependent upon the mechanism by which the film itself was formed.

In order that the above-mentioned swell and shrink amplitude figures may be more fully understood, the test for measuring this property of film or sheet material is given in detail below.

*Swell and shrink amplitude test*

A sample of film or sheeting is conditioned and measured both before and after processing in a constant humidity room at a relative humidity of 50%, or as close thereto as is possible, and at a dry bulb thermometer reading of 70° F. For photographic film support of cine positive thickness (.0055 inch) or less, the time of conditioning before processing should not be less than 1¼ hours; after processing not less than 2¼ hours. Film support of X-ray thickness (.008-.009 inch) should be conditioned at least 2¼ hours before processing and 3-5 hours after processing. Sheeting of thickness greater than .009 inch should be conditioned longer or until equilibrium is established. An emulsion coated film material should be conditioned for at least 2½ hours both before and after processing.

Strips 15 inches long and 1½ inches wide are cut from the film material. Usually two strips from each sample lengthwise of the film material and two strips widthwise are used for the test and two sets of perforations are made in each strip. These strips are perforated on a punch and die perforating machine, the holes being approximately 10 inches apart. Measurements from outside edge to outside edge of the perforation holes are taken. Thus a reading, if immediately taken, should be zero on the gauge. The gauge employed is graduated in thousandths of an inch and, since the perforations are 10 inches apart, the percentage of dimensional change may be read directly from the gauge by merely moving the decimal point one place to the right.

The strips are conditioned at 50% relative humidity and measured. They are then tacked loosely on a wooden rack and placed in a constant temperature thermostatically controlled water bath at 100° F. and left for 17 hours. The samples are then wiped to remove excess moisture and reconsidered at 50% relative humidity and measured again and the dimensional change computed. This test measures the irreversible shrinkage, if any, due to loss of solvent from the film material and also that due to the release of internal mechanical strains.

The samples are then placed in a water bath at 125° F. for 30 minutes, spacing them in and out a minute or so apart to allow time for measuring. Care is taken to measure as speedily as possible after the removal from the water after giving them a quick wipe with a towel to remove surplus water as shrinkage takes place almost instantly. The sample is then placed in an oven at 125° F. for one hour, then taken out and measured. This cycle is repeated three times or until the difference between the wet and dry readings becomes constant. The difference between the last wet and dry readings in percentage is the per cent swell and shrink amplitude. This test measures the permanent, characteristic tendency of the film material to swell and shrink under the influence of absorbed and desorbed moisture, the difference between the lengthwise and widthwise measurements representing the amount of non-uniformity in the structure lengthwise and widthwise.

It will be seen from the above examples that no hard and fast rules can be laid down as to the composition of our film-forming solutions for all purposes, since the composition of a given solution will be adjusted in accordance with the particular conditions of coating, stripping and curing which are to be employed. In general, it may be said that for a practical process a given composition should be, in accordance with our invention, such that the cellulose derivative in question goes into solution at temperatures at or above 50° C. and remains fluid above that temperature.

Furthermore, in accordance with preferred procedure, the particular film-forming solution or dope selected for operation under the temperature gelation procedure should be one which experiences a rather sharp increase in viscosity within a comparatively narrow temperature range, say of the order of about 20° C. Under the selective evaporation procedure of film formation, the temperature range within which gelation of the dope takes place is not especially significant, since solidification or gelation takes place by virtue of a change in the relationship between the various components of the solvent mixture, rather than under the influence of the temperature change per se. For optimum results, both under the temperature gelation and selective evaporation techniques, but particularly in the former, we prefer to work in the central regions of the different variables discussed above, that is, to employ compositions containing about 25% hydrocarbon, about 10% alcohol and a cellulose acetate propionate or acetate butyrate containing 15 or 20% of either propionyl or butyryl and having had only a moderate amount of hydrolysis.

At this point, it may be well to refer again to what is meant by gelation temperature. By this term we do not necessarily refer to an exact temperature, but rather to a maximum temperature below which the cooling solution or dope undergoes a marked and rather sudden increase in viscosity. While no exact maximum can be specified which will cover all possible cases, we may say that gelation or solidification of those compositions which we have found most satisfactory takes place at temperatures below about 40° C.

In general, the curing after stripping of sheet or film material produced in accordance with our invention may be carried out as set forth above by standard curing procedures, that is, by conducting the material through appropriate curing chambers where it is subjected to the action of air maintained at elevated or moderately elevated temperatures. It is desirable to subject the film material to low tension during the curing operation in order that the final product may have the desired physical properties. In fact, the sheet or film material produced in accordance with our invention should be subjected to the least tension possible during curing. This will be particularly desirable in those cases in which the film, after stripping, contains a very high proportion of the original solvent content.

Although our process finds particular application in the manufacture of photographic film support, it is broadly applicable to the manufacture of other types of sheeting, particularly thin sheeting adapted for wrapping purposes. In fact, one of the distinguishing and unusual features of our invention is the fact that, due to their peculiar composition and characteristics, satisfactory gelling of our film-forming compositions is quite independent of the thickness of the deposited layer, although the thicker the layer, the lower is the casting speed due to the relatively lower heat transference of thick layers as compared to thin layers. We may, however, produce films or sheets anywhere from a few ten thousandths inches or less to almost any desired thickness. It will thus be seen that our process is adapted, not only for the manufacture of photographic film support and even much thinner types of sheeting, such as those employed for wrapping purposes, but also for the manufacture of sheets adapted for use in the fabrication of laminated glass, container stock, and many other products.

Our process has many advantages over known film-making processes which involve the use of the usual evaporative type dopes, but the most outstanding advantage is the marked increase in speed of film formation obtainable thereby. Whereas the stripping time required in ordinary film-forming processes runs on the average about 12 minutes, by employing the process of the present invention this period may be reduced from one-half (under the more unfavorable conditions of operation as to composition of dope, temperatures employed and other factors) to one-tenth or less. It will thus be seen that our process constitutes a very substantial advance in the film-making art. As previously indicated, our invention is particularly characterized by the fact that it provides for flexibility of operation in that one may employ either the straight temperature gelation or the selective evaporation procedure at will. Under some circumstances, it may be more economical and otherwise advantageous to operate under the selective evaporation procedure than under the temperature gelation procedure. In other words, our invention makes possible the use of a variety of film-casting conditions.

Another outstanding feature of our invention is the fact that the films obtained thereby have markedly improved physical properties as compared to films made according to the prior art procedure involving the use of evaporative type dopes and, in fact, superior to films made under any of the known high speed processes of the present day. This will be apparent from a consideration of the following table in which is incorporated comparative data obtained from physical tests made on film produced both in accordance with the customary film-making process and film produced in accordance with our invention.

*Physical properties of a cellulose acetate propionate film produced from an ester containing 30.1% acetyl and 16.7% butyryl (10% triphenyl phosphate on the weight of the cellulose ester as plasticizer)*

|  | Film A [1] (evaporative dope) | Film B [1] hot wheel | Film C [1] cold wheel |
|---|---|---|---|
| Tensile along | 20.4 kilos | 24.3 kilos | 25.4 kilos. |
| Tensile across | 18.6 kilos | 21.5 kilos | 22.6 kilos. |
| Flexibility | 39 folds | 46 folds | 44 folds. |
| Stretch along | 50.5% | 55% | 48.2%. |
| Stretch across | 60.0% | 73.8% | 60.7%. |
| Swell and shrink amplitude: | | | |
| Along | .81% | .38% | .40%. |
| Across | .92% | .37% | .46%. |

[1] Solvent:
Film A—
  50% ethylene chloride
  50% propylene chloride
Film B—
  65% ethylene chloride
  10% n-butyl alcohol
  25% cyclohexane
Film C—
  68% ethylene chloride
  10% n-butyl-alcohol
  22% cyclohexane The above table illustrates the remarkable improvement in physical properties of film produced in accordance with our invention as compared to films produced from the same cellulose ester by conventional evaporative methods of coating or casting. There is a marked improvement in tensile strength and at the same time a considerable decrease in the swell and shrink amplitude. Ordinarily the swell and shrink amplitude of a given cellulose ester is reduced by increasing the proportion of water-repellent plasticizer in the film, a procedure which always results in decreased tensile strength.

In the claims appended hereto, we have defined our film-forming compositions by reference to the fact that they are solutions of cellulose organic acid esters of the indicated type dissolved in liquid solvent combinations which liquids are solvents for the esters only at temperatures above 50° C., the liquids being present in a weight which will give solutions which are gelable within the range of 10–50° C. From the examples it will be apparent that we prefer a weight of liquid ranging from 3–1 to 6–1. However, within the definition of the second preceding sentence, we may employ a weight of liquid as low as 2–1 or even as high as 7–1 and still obtain gels within the range of 10–50° C. By the terms "gel" and "gelable" we refer to that characteristic of such compositions by virtue of which they can be brought into a condition of substantially infinite viscosity. These "gels" are self-supporting, i. e., if a glass bottle containing our composition is cooled to a gelling temperature within the range of 10–50° C. the entire solution will set to a homogeneous gel containing all of the cellulose ester and all of the solvent, the gel being of such a character that the glass can be broken away from the gel and the gel will retain the shape of the bottle, will stand without flowing, and can be handled without deformation, at that temperature. Interestingly enough, these gels have a rubbery "feel." By defining our compositions as gelable within the range of 10–50° C. we are not to be understood as indicating that the use of such compositions is limited to a use wherein gelation only occurs within the confines of this temperature range, this property of gelation merely being one of the distinguishing characteristics of our compositions. As is obvious from the foregoing specification, the compositions of our invention, in addition to gelling at 10–50° C. may be cast at higher temperatures and caused to set at temperatures above 50° C. by selective evaporation of a portion of the lowest boiling components of the composition.

This application is a division of our copending application, Serial No. 349,370, filed August 1, 1940.

What we claim is:

1. A film-forming composition selected from the group of compositions included within the respective areas of Figs. 2–18 of the drawings comprising a cellulose organic acid ester selected from the group consisting of cellulose propionates, cellulose butyrates, cellulose acetate butyrates containing at least 5% of an acyl radical selected from the group consisting of propionyl and butyryl and not less than about 40% total acyl dissolved in a liquid which is a solvent for the ester only at a temperature above 50° C., said liquid being composed of 10–50% of a non-aromatic hydrocarbon selected from the group consisting of ligroin, cyclohexane, and methyl cyclohexane, 5–30% of a monohydric aliphatic alcohol of 1–5 carbon atoms, and 40–80% of an alkylene chloride of 2–3 carbon atoms, said composition being characterized by the fact that it can be employed in the manufacture of uniaxial photographic film base and similar types of sheeting at speeds comparable to those attained by the coating of gel dopes and susceptible of solidification, not only by gelation at a temperature within the range of 10–50° C., but also susceptible of solidification by rapid evaporation of solvent.

2. The composition of claim 1 in which the non-aromatic hydrocarbon is ligroin.

3. The composition of claim 1 in which the non-aromatic hydrocarbon is cyclohexane.

4. The composition of claim 1 in which the non-aromatic hydrocarbon is methyl cyclohexane.

WALKER F. HUNTER, JR.
HOWARD A. TANNER.
ROBERT E. GILLMOR.